Jan. 21, 1969
C. L. WAGNER
3,423,634
DIFFERENTIAL RELAYING NETWORK
Filed Jan. 18, 1967
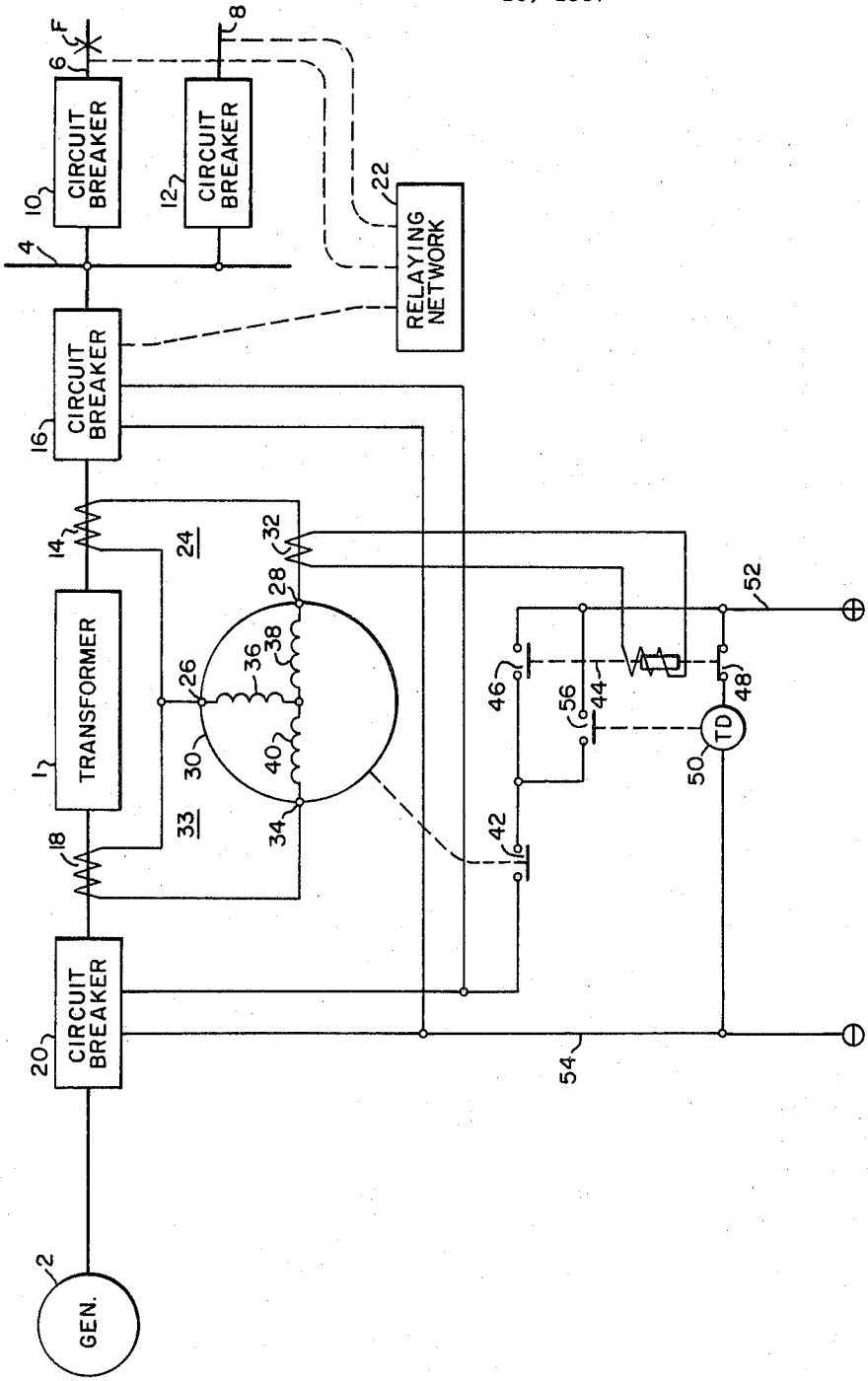
WITNESSES:
Bernard R. Gieguey
James F. Young
INVENTOR
Charles L. Wagner
BY John L. Stoughton
ATTORNEY

3,423,634
DIFFERENTIAL RELAYING NETWORK

Charles L. Wagner, Franklin Township, Export, Pa., assignor to Westinghouse Electric Corporation, Pittsburgh, Pa., a corporation of Pennsylvania
Filed Jan. 18, 1967, Ser. No. 610,050
U.S. Cl. 317—14          7 Claims
Int. Cl. H02h 7/14

ABSTRACT OF THE DISCLOSURE

This disclosure described a differential relaying network in which there is provided a current responsive device and a timing device which cooperate together to prevent the operation of a differential current responsive relay until the protected device has been transferring power for a predetermined time interval following an interval of no power transfer and which will maintain the differential current responsive relay effective to protect the protected device thereafter free from any time interval introduced by the timing device.

---

This invention relates generally to differential relaying networks and more particularly to such a network in which the differential relay is rendered ineffective for a predetermined time interval subsequent to the initiation of transfer of power through the protected device.

In prior art systems in which a differential relay is used to protect a transformer interposed between a source of electrical energy and a distributing bus, a fault occurring in one of the output circuits served by the distributing bus sometimes falsely actuates the relay to isolate the transformer. This false operation is due to the fact that the voltage supplied by the generator to the bus tends to decrease because of the fault causing the generator voltage regulating system to compensate for this decrease by increasing the generator excitation in an endeavor to maintain the normal output potential at the bus. If the breaker connecting the transformer to the bus thereafter opens, the generator voltage regulator will not be able to reduce the generator output voltage suddenly and the voltage supplied to the transformer rises to 120, 130 or possibly 140 percent of normal voltage. This overvoltage causes high excitation currents in flow. In some instances these high exciting currents are high enough to cause the differential relay to operate. This operation of itself is not particularly harmful since the generator will have already been tripped off the line by the breaker. The difficulty is that when the operator sees the differential relay has operated he is in a quandry to know whether is was caused by a failure of the transformer. If such is the case, it should not be reset since more damage to the transformer could result. To be sure that the transformer was not the cause special tests are required which take time and are expensive.

To correct this situation, this invention contemplates a relay, the provision means responsive to current flow between the transformer and the bus to operate a time delay mechanism which will prevent the differential relay from tripping the power supplying breaker or in the alternative reduce the excitation of the connected alternator to terminate its output power. The time delay mechanism is preferably set to provide an interval of 1 to 4 seconds. This may be varied but is believed to be sufficient in most instances to permit the transformer magnetizing current to stabilize. Subsequent to the timing out of the time delay mechanism, the differential relay is again rendered effective to protect the power transformer.

It is an object of this invention to provide a safety device for a differential relay which will render the differential relay ineffective for a predetermined time period subsequent to termination of the flow of power therethrough.

It is a further object of this invention to provide a device which responds to the output current of the transformer for actuating a time delay mechanism to render the differential relay ineffective for a predetermined time period subsequent to termination of flow of power through the transformer.

Other objects will be apparent from the description, the hereinafter appended claims and the drawings in which drawings the sole figure thereof illustrates a differential relay network embodying the invention.

Referring to the drawings by characters of reference, the numeral 1 indicates generally a mechanism to be protected such as a transformer connecting a power energized bus or other source of electrical energy such as a generator 2 to a bus 4 which supplies a plurality of transmission lines; two of which are illustrated and identified by the reference characters 6 and 8. Breakers 10 and 12 connect the lines 6 and 8, respectively, to the distribution bus 4. The transformer 1 is connected to the bus 4 through a first current transformer 14 and a breaker 16 and to the generator 2 by a second current transformer 18 and a breaker 20. Under some instances it may be desirable to omit the breaker 20 and deenergize the transformer 1 by reducing the output of the generator 2.

Suitable relaying networks (not shown) are associated with the transmission lines 6 and 8 for actuating the breakers 10 and 12 respectively, should faults occur in the lines 6 and 8. A back-up relaying network 22 connected with the breaker 16 and associated with the lines 6 and 8 serves as a backup breaker to disconnect the bus 4 should a breaker 10 or 12 fail to act in response to a fault of the line controlled thereby.

The current transformers 14 and 18 and the differential relay 30 in the absence of the mechanism controlled by the current transformer 32 is conventional. As illustrated the transformer 14 is connected by a first current conducting circuit 24 between the terminals 26 and 28 of the differential relay 30 and the current transformer 18 is connected by a second current conducting circuit 33 between terminals 34 and 26 of the differential mechanism or relay 30. The relay 30 is conventional and includes an operate winding 36, a pair of restraint windings 38 and 40 and a switch 42 controlled when the energization of the operate winding 36 has a predetermined degree of energization with respect to the total energization of the restraint windings 38 and 40 as is well known.

With the structure so far defined and a power input into the transformer 1 substantially equal to the power output from the transformer currents of substantially equal magnitude will flow through the first and second circuits 24 and 33 through the restraint windings 38 and 40 and substantially no current will flow through the operate winding 36. If, however, an internal fault develops in the transformer 1, more power will flow into the transformer 1 than flows outwardly therefrom and the equal relating magnitude of current flow in the first and second circuits 24 and 33 no longer exists. The difference current flows through the operate winding 36 and if it is of predetermined magnitude with relation to the current flow in the restraint windings 38 and 40, the switch 42 will close and trip the breakers 16 and 20. This as is illustrated, disconnects the transformer from both the generator 2 and the bus 4.

In accordance with this invention the primary winding of a current transformer 32 is connected into the first current circuit 24. The secondary winding of this transformer 32 is connected to energize a relay 44 having normally open contacts or switch 46 and normally closed contacts or switch 48. The relay 44 controls the operation of a time delay relay or mechanism 50 having its operating mechanism (not shown) connected in series with the normally closed switch 48 between a pair of direct current energized buses 52 and 54. The time delay relay 50 is provided with a normally open switch 56 which closes after a predetermined time interval subsequent to the energization of its operating mechanism. The switch 56 will open substantially immediately following the deenergization of the mechanism of relay 50.

The normally open switch 46 and the switch 56 are connected in parallel with each other and each is in series with the relay switch 42 between the buses 52 and 54 through the trip coil (not shown) of the breakers 16 and 20. It will be apparent from the foregoing that one or the other of the switches 46 or 56 must be closed to permit the switch 42 to actuate the breakers 16 and 20.

It is believed that the remainder of the details of construction may best be understood by a description of operation of the apparatus which is as follows: Assume first a condition in which breakers 16 and 20 are open whereby the transformer 1 is completely disconnected from the generator 2 and from the bus 4. Under these conditions no current flows through either the first or second circuits 24 and 33. The relay 44 is deenergized and its normally open switch 46 is open and its normally closed switch 48 is closed. Since the buses 52 and 54 are energized, operating mechanism of the time delay relay 50 will be energized and the normally open switch 56 will be closed. If now only the breaker 20 is closed current will flow from the generator 2 to the transformer 1. Since no current flows through the current transformer 14, the switch 56 is closed, and the operation of the trip windings of the breaker 20 is under the sole control of the switch 42 of the differential relay 30 and the relay 30 is operable to trip the breakers in response to the occurrence of an internal fault in the transformer 1 in the usual manner and the transformer 1 is completely protected without any interposition of a time delay caused by the added time delay relay 50.

With the transformer 1 so energized, closure of the breaker 16 causes current flow between the transformer 1 and the bus 4 whereby the first circuit 24 is energized. The current transformer 32 associated therewith energizes the relay 44 which closes its normally open switch 46 and opens its normally closed switch 48. Closure of the normally open switch 46 establishes a preparatory circuit in shunt with the contacts 56 of the time delay relay 50 (which subsequently opens because of the opening of the switch 48) so that the operation of the breakers 16 and 20 to protect the transformer 1 will continue to be under control of the differential relay 30.

Assume a fault F on the transmission line 6 and that for some reason or other, the normal relaying network operating the breaker 10 (not shown) fails to operate and back-up relaying network 22 operates to trip the breaker 16. During the time interval after the occurrence of the fault F and before the breaker 16 opens, the generator voltage regulator (not shown) has been increasing the field current trying to maintain the voltage at normal magnitude. Therefore, when the breaker 16 opens, the generator terminal voltage will suddenly rise 120, 130 to possibly 140 percent of normal because of the time delay of the generator voltage regulation. This overvoltage over-excites the transformer 1 causing high excitation current to flow. This high excitation current is in many instances enough so that the differential winding 36 is energized beyond the predetermined amount and the differential relay needlessly operates to close its switch 42 and trip the breaker 20.

Normally such operation of this differential relay 30 under the above conditions is not harmful since the generator will have already been a tripped off line. However when the station operator returns and finds that the differential relay has been tripped it becomes extremely time consuming to ascertain whether the tripping of this differential network is due to a fault in the transformer 1 or whether it occurred for some other reasons as for example the reasons discussed above. With applicant's invention utilizing the current transformer 32 which responds to the current flow in the first circuit 24 which is proportional to current flowing from the transformer 1 to the line 4, this unnecessary operation of the breaker 16 due to the differential current flowing in the differential relay 30 is eliminated.

With applicant's arrangement the relay 30 is rendered ineffective upon the termination of current flow through the first circuit 24 which occurs as a consequence of the opening of the breaker 16. This current termination deenergizes the relay 44 allowing its normally open switch 46 to open and normally closed switch 48 to close. The opening of the contacts or switch 46 renders any closure of the switch 42 ineffective to trip the breaker 16; both switches 46 and 56 being at this time, open.

The delay of the relay 50 between closure of the contacts 48 and closure of the switch 56 may be set at various intervals a suitable interval being from 1 to 4 seconds. Since this interval is believed to be sufficiently long to permit the voltage output of the generator 2 to assume its desired value and the transient magnetizing current in the transformer 1 to terminate whereby the magnetizing current of the transformer 1 assumes its normal value. At the end of this delay period, the time delay relay 50 times out and closes its switch 56 whereby the protection of the transformer 1 is again returned to the differential relay 30 and an apparatus will work in the normal manner.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

What is claimed and is desired to be secured by United States Letters Patent is as follows:

1. An improvement in a differential relaying network, said network being characterized by having a first circuit traversed by a current of a magnitude responsive to the magnitude of the current flowing to a protective device from an energy source, a second circuit traversed by a current of a magnitude responsive to the magnitude of the current flowing to a load from the protected device, a control mechanism connected to said first circuit and suitable to prevent flow of electrical energy to said protected device, and differential means connected to said circuits and responsive to the difference in the magnitudes of said circuit currents, said differential means being connected to said control mechanism to actuate said control mechanism to prevent further flow of current to said protected device from said source; the improvement comprising the addition of a time delay mechanism, said delay mechanism being operable to transfer from a set to a timed out operating condition upon the expiration of a first time interval when energized for an interval not less than said first interval and operable to return to said set condition upon being deenergized, circuit means connecting said time delay mechanism to one of said circuits for energization thereof as a consequence of current flow through said one circuit of a magnitude less than a critical magnitude and for deenergizations thereof when said current flow through said one circuit is of a magnitude greater than said initial magnitude, and a network interposed between said control mechanism and said differential means for controlling the effectiveness of said differential means to actuate said control mechanism, said network including said delay mechanism and being effective to render said differential means ineffective solely when said delay mechanism is in its said set condition and the magnitude of said current flow through said one circuit is less than said internal magnitude.

2. The combination of claim 1 in which said time delay mechanism includes first switch maintained in closed condition solely when said delay mechanism is in its said timed out condition, said circuit means including a current actuated relay having a controlling circuit connected to said one circuit and energized as a junction of the magnitude of the current flowing through said one circuit, said relay having a normally closed switch and a normally open switch, said current actuated relay being effective to close its said normally open switch and to open its said normally closed switch solely when the current flowing in said one circuit is of at least said critical magnitude, said delay mechanism being energized solely when said normally closed switch is in its said closed condition.

3. The combination of claim 2 in which said differential means has a normally open switch, said network including said normally open switch of said delay mechanism and said normally open switch of said current relay connected in parallel with each other and in series with said normally open switch of said differential means.

4. A network for protecting an electrical apparatus having power input and output connections, a first translating device having an actuating means and actuated means, said device being characterized by the part that it is effective to activate its said actuated means in response to the existence of a predetermined difference in the magnitude of two quantities applied to its said actuating means, first and second supplying means connected to supply respectively first and second of said two quantities to said actuating means, a second translating device having a controlling means and allotted to provide a contact sequel solely when its said controlling means is actuated, means connecting said controlling means of said second translating device to one of said supplying means for actuating said second device as a function of the magnitude of the one of said quantities which is supplied by said one supplying means, a timing device connected to said second translating device and effective to provide a control signal subsequent to a predetermined interval after actuation by said second translating device, an output connection means connecting said timing device and to both of said translating devices in actuation under the combined control thereof, said last-named means being effective to actuate said output connection solely when at least one of said control signals is present concurrently with the actuation of said actuated means of said first translating device.

5. The combinations of claim 4 in which said first translating device is a differential relay and its said actuated means is a switch means actuated to its circuit open condition when the relative magnitudes of said two quantities exceed a desired magnitude, either of said control signals resulting in the closing of a switch means, said switch means being arranged in series, and said output connection being connected between a pair of electrically energized buses of said switch means.

6. In a differentially actuated relay network, first and second pairs of input terminals, a differential relay having control working means and an output circuit, a current sensitive relay having an input winding and a set of normally open contacts and a set of normally closed contacts, a time delay relay having an input circuit and normally open contacts which close a predetermined time interval subsequent to the energization of said input circuit, a pair of output terminals, first circuit means connecting a first terminal of said first pair of input terminals to a second terminal of said second pair of input terminals, a second circuit means connecting a second terminal of said first pair of input terminals to a first terminal of said second pair of input terminals and including first and second portions of said control winding means and said input winding means, a third circuit means connecting said first circuit means to said second circuit means at a point intermediate said first and second portions and including a third portion of said control winding means, a pair of energy supplying buses, a fourth circuit means connected between said buses and including in series circuit said normally closed contacts of said current relay and said input circuit of said delay relay, a fifth circuit means connected between said buses and including in series circuit said pair of output terminals and said output circuit of said differential relay and said normally open contacts of said delay relay, said fifth circuit further including said normally open contacts of said current relay in parallel with said normally open contacts of said delay relay.

7. The combination of claim 6 in which there are first and second sets of power buses interconnected by a power transformer, first and second current transformers having primary and secondary windings, said primary winding of said first transformer being connected to a bus of said first set of power buses to conduct current in a magnitude proportional to the current flow in said first set of power buses, said primary winding of said second transformer being connected to a bus of said second set of power buses to conduct current in a magnitude proportional to the current flow in said second set of power buses, said secondary windings of said first and second current transformer being connected individually to said first and second pairs of input terminals and in a plurality such that with electrical energy flowing into said power transformer from said first set of buses and out of said power transformer through said second set of buses said first terminals of said first and second pairs of input terminals are at the same polarities with respect to their associated said second terminals.

References Cited
UNITED STATES PATENTS

| | | | |
|---|---|---|---|
| 1,959,053 | 5/1934 | Goldsborough | 317—14 X |
| 2,863,100 | 12/1958 | Rice | 317—27 |
| 3,275,889 | 9/1966 | Sharp et al. | 317—14 |

JOHN F. COUCH, *Primary Examiner.*

J. D. TRAMMELL, *Assistant Examiner.*

U.S. Cl. X.R.

317—27